United States Patent [19]

Norita et al.

[11] Patent Number: 4,768,054
[45] Date of Patent: Aug. 30, 1988

[54] FOCUS CONDITION DETECTING DEVICE

[75] Inventors: Toshio Norita, Sakai; Tokuji Ishida, Daito; Masataka Hamada, Osaka; Toshihiko Karasaki, Sakai; Nobuyuki Taniguchi, Nishinomiya, all of Japan

[73] Assignee: Minolta Camera Kabushiki Kaisha, Osaka, Japan

[21] Appl. No.: 14,923

[22] Filed: Feb. 13, 1987

[30] Foreign Application Priority Data

| Feb. 14, 1986 [JP] | Japan | 61-31392 |
| Mar. 5, 1986 [JP] | Japan | 61-49060 |
| Mar. 5, 1986 [JP] | Japan | 61-49061 |
| Mar. 5, 1986 [JP] | Japan | 61-49062 |

[51] Int. Cl.$^4$ ............................................. G03B 3/10
[52] U.S. Cl. ................................................ 354/408
[58] Field of Search ........................... 354/400–409; 250/201 PF, 204

[56] References Cited

U.S. PATENT DOCUMENTS

| 4,387,975 | 6/1983 | Araki | 354/407 |
| 4,474,447 | 10/1984 | Kawabata et al. | 354/406 |
| 4,483,602 | 11/1984 | Aoki et al. | 354/402 |
| 4,523,829 | 6/1985 | Eguchi et al. | 354/406 |
| 4,561,749 | 12/1985 | Utagawa | 354/406 |
| 4,573,784 | 3/1986 | Suzuki | 354/406 |
| 4,636,624 | 1/1987 | Ishida et al. | 354/406 X |

FOREIGN PATENT DOCUMENTS

| 60-120675 | 6/1985 | Japan . |
| 60-183879 | 9/1985 | Japan . |
| 214319 | 10/1985 | Japan | 354/408 |
| 61-18912 | 1/1986 | Japan . |
| 61-22316 | 1/1986 | Japan . |
| 61-55618 | 3/1986 | Japan . |
| 61-55619 | 3/1986 | Japan . |

OTHER PUBLICATIONS

Ishida et al., Ser. No. 735,569, filed 5/17/85.
Hamada et al., Ser. No. 924,888, filed 10/30/86.
Taniguchi et al., Ser. No. 945,879, filed 12/23/86.
Ishida et al., Ser. No. 946,486, filed 12/23/86.

Primary Examiner—W. B. Perkey
Attorney, Agent, or Firm—Price, Gess & Ubell

[57] ABSTRACT

An automatic focusing device for a camera is disclosed. The automatic focusing device has sensing means for sensing light intensity distributions within narrow and wide areas of a field of view of an objective lens, respectively and can be operated in either operation mode of one-shot AF mode and continuous AF mode. When the one-shot AF mode is designated, said narrow area which is narrower than said wide area is automatically selected for focus condition detection and, when the continuous AF mode is designated, said wide area is automatically selected.

10 Claims, 13 Drawing Sheets

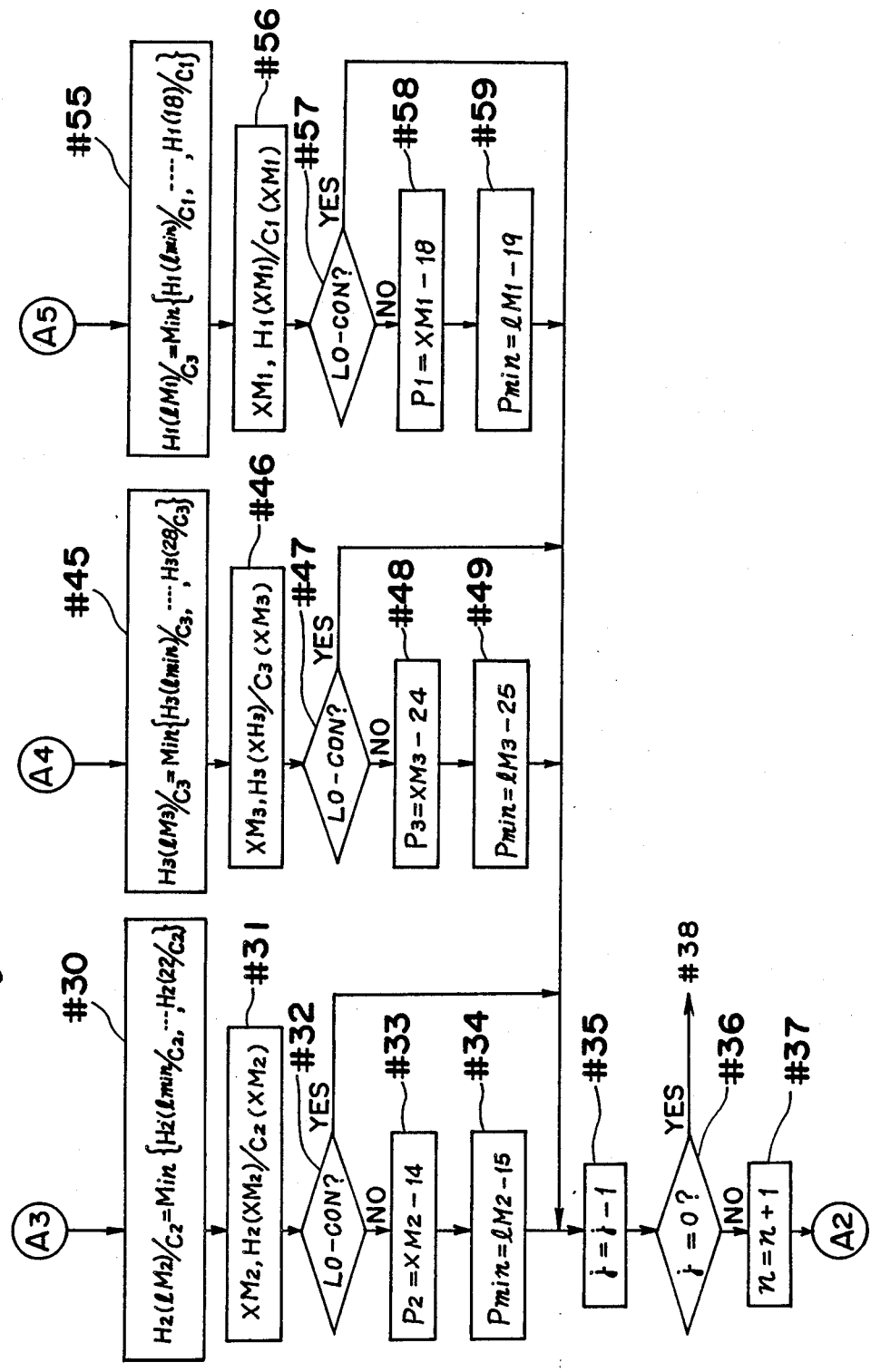

FOCUS CONDITION DETECTING DEVICE

BACKGROUND OF THE INVENTION

1. Field of the Invention

The present invention relates to a focus condition detecting device in which an image of a target object formed by an objective lens is re-formed, by first and second refocusing lenses disposed symmetrically with respect to the optical axis of the objective lens, into first and second optical images on first and second detection means for detecting the first and second optical images, respectively and a distance between the first and second optical images is calculated on the basis of illuminance distributions of the first and second optical images detected by the first and second detection means, respectively such that focus condition of the objective lens relative to the target object, and especially the amount of deviation (defocus amount) of the image of the target object from a predetermined image forming plane is detected from the distance between the first and second optical images.

2. Description of the Prior Art

FIGS. 1 and 2 show an optical system of a prior art focus condition detecting device of this kind and formation of images therein, respectively. The known optical system includes an objective lens 2, a predetermined focal plane 4 positioned rearwardly of the objective lens 2 and a condenser lens 6 positioned rearwardly of the predetermined focal plane 4. The condenser lens 6 is constituted by a spherical lens. Furthermore, the known optical system includes a pair of refocusing lenses 8 and 10 positioned rearwardly of the condenser lens 6 and a pair of line sensors 12 and 14 positioned at image forming planes of the refocusing lenses 8 and 10, respectively. Each of the line sensors 12 and 14 has a charge coupled device (CCD) used as a photo-sensor array. First and second images of a target object are, respectively, formed on the line sensors 12 and 14. These images come close to an optical axis 18 in a front focus condition in which an image of a target object to be focused is formed forwardly of the predetermined focal plane 4, as indicated by arrows A, a, and a' in FIG. 2. On the contrary, the images are spaced away from the optical axis 18 in a rear focus condition in which the image of the target object is formed rearwardly of the predetermined focal plane 4, as indicated by arrow B, b and b' in FIG. 2. In an in-focus condition in which the image of the target object is formed on the predetermined focal plane 4, a distance between corresponding points of the two images is set to a specific distance determined by design conditions of the optical system. Therefore, in principle, the focus condition of the optical system can be detected by measuring the distance between the two images.

The detection of the distance mentioned above can be made as follows.

Now, assume that the first and second image sensors 12 and 14 are comprised of ten and sixteen cells of photodiodes ($a_1, \ldots, a_{10}$) and ($b_1, \ldots, b_{16}$), respectively. Considering now sets each of which is comprised of ten successive cells included in the second image sensor, seven sets $B_1, B_2, \ldots, B_7$ can be obtained. The focus condition can be sought by calculating individual correlation relation between the image received by ten cells of the first image sensor 12 and the image received by each of seven sets of the second image sensor 14.

Namely, correlation calculations are made with use of correlation functions;

$$Si = \sum_{j=1}^{10} |a_j - b_{i-1+j}| \quad (1)$$

$$(i = 1, 2, \ldots, 7).$$

For example, if the image detected by the first sensor 12 coincides with the image detected by the first set $B_1$ of the second image sensor 14, the correlation function $S_1$ becomes minimum among seven correlation functions $S_1, S_2, \ldots, S_7$. When either one set of the second sensor is found which gives the minimum value with respect to these correlation functions, the distance between two images is determined from the number of the set having been found minimum and a focus condition is detected based on the distance determined. These calculations are carried out by a correlation calculation means 16.

In an automatic focus adjusting device of a camera having such an optical system for detecting a focus condition as mentioned above, there is provided a control circuit including at least one micro-computer and a sequence comprising integration (charge accumulation) operations by respective CCD image sensors for detecting light intensity distributions of an object; a calculation for detecting a focus condition according to outputs from the CCD image sensors (a calculation of an amount and direction of defocus), a lens drive based on the defocus amount and direction detected; a stop of an objective lens at an in-focus position and a shutter release (if a shutter button of the camera is pushed down) is controlled by the control circuit according to programs stored therein. This auto-focus adjusting device repeats the sequential auto-focus control even when the objective lens is approached to an in-focus position detected in order to locate the objective lens thereat. Such a focus condition detection is performed with respect to a portion of an object image located within a limited area in the field of view of the objective lens of the camera (a focus detecting area).

Let's consider such a case wherein a picture of a moving object is taken the use of a camera having an auto-focus adjusting device of the above described type which is sensitive only to a portion of the object located within the limited area in the field of view of an objective lens.

In such a case, a distance from the object to the camera is varied according to the movement thereof. Therefore, it becomes necessary to repeat a focus condition detection operation and a lens driving operation for the focus adjustment based upon the result of the focus condition detection operation. In other words, a continuous auto-focus adjusting mode (hereinafter, referred to a "continuous AF mode") is needed in which the focus condition detection operation and the lens drive operation are repeated even after an in-focus condition has been obtained once. Further, it becomes necessary to pursue a main target so that it can be located within the limited focus detection area during autofocusing in the continuous auto-focus mode, and, therefore, it is desirable to enlarge the focus detection area as large as possible. However, in the case wherein a wide focus detection area is set, the result of a focus condition detection is greatly affected by a secondary trget having a high contrast as far as the image thereof is located within the wide focus detection area.

In order to avoid such a disadvantage as mentioned just above, there has been proposed a focus condition detecting system wherein a CCD line image sensor as shown in FIG. 3 is employed (See U.S. Pat. No. 4,636,624). This line image sensor 15 has a first and second portions referred to as a standard and reference portion L and R, respectively. In the standard portion L, three overlapped blocks I, II and III for detecting a focus condition are defined so as to have elements from $l_1$ to $l_{20}$, elements from $l_{11}$ to $l_{30}$ and elements from $l_{21}$ to $l_{40}$, respectively.

In this system, three correlation calculations are executed with use of these first to third blocks (I), (II), (III) and the reference portion R. A distance between two images refocused on the standard and reference portions is calculated with the use of a block which gives the highest correlation among the first to third blocks. A defocus amount and direction is calculated based on the image distance obtained and the objective lens is driven corresponding to the defocus amount and direction.

However, in this system, it takes a relatively long time to execute the focus condition detection operation since the correlation calculation must be repeated three times. Accordingly, this system is not so effective for a moving object although it is suitable for pursuing a moving object.

SUMMARY OF THE INVENTION

Accordingly, it is an object of the present invention to provide a focus condition detecting device or an automatic focusing device which is capable of increasing the speed of the focus detection operation.

Another object of the present invention is to provide an automatic focusing device which is capable of changing the focus detection area, that is, the sensing area within the field of view of an objective lens used for focus condition detection, depending on a change of its operation mode.

In a focus condition detection device or an automatic focusing device of the present invention, first and second images of an object are formed by optical means from first and second light fluxes having passed through first and second areas of the objective lens such that the distances between these images vary with the focus condition of the objective lens relative to the object. First and second sensor arrays for sensing the first and second images, respectively, are provided with a plurality of sensing elements capable of generating an output signal representing the intensity of light incident thereon and forming a different portion of the corresponding image. The first sensor array is divided by dividing means into a plurality of blocks, each having a predetermined number of sensing elements. The outputs of the sensing elements of each block of the first sensor array and the outputs of the sensing elements of the second sensor array are sequentially shifted relative to one another by calculation means, which in turn calculates the correlation between these outputs at every shift position for finding, for each block of the first sensor array, the best correlation among the calculated correlation and a best correlation shift position providing the same and thereby generates focus condition signals in accordance with the best correlation shift positions found for the respective blocks of the first sensor array. Output means selectively outputs one of these focus condition signals while storing means stores the block of the first sensor array, for which is found the best correlation shift position used for the generation of the focus condition signal outputted from the output means. The next time correlation calculation by the calculation means is controlled by control means which causes the calculation means to calculate correlations between the outputs of the sensing elements of the stored block of the first sensor array and the outputs of the sensing elements of the second sensor array preferentially. However, if the reliability of the focus condition detection with the use of the stored block of the first array is determined to be relatively low, the control means causes the calculation means to calculate correlations between ten outputs of the sensing elements of another block of the first sensor array and the outputs of the sensing elements of the second sensor array, so that the focus detection is effected with use of this block in place of the previously used block of the first sensor array.

In the case of the automatic focusing device of the present invention, the focus condition signal outputted from the output means is fed to drive means for driving the objective lens for focusing. When it is determined that the objective lens has been driven to an in-focus position, this determination result is stored in another storing means and the shift range for the correlation calculation by the calculation means is limited to a smaller range including an in-focus shift position providing the best focus correlation when the objective lens is in-focus with respect to the object. However, this limitation of the shift range is not effected when it is determined that the reliability of the focus condition detection with the limited shift range is relatively low.

Furthermore, in the automatic focusing device of the present invention, its operation mode is changed-over between first and second modes, and the focus detection is effected with the shift range set to a smaller range in the first operation mode than in the second operation mode. It is to be noted that the first operation mode is the one-shot auto-focus mode while the second operation mode is the continuous AF mode in a preferred embodiment of the present invention.

BRIEF DESCRIPTION OF DRAWINGS

The above and other objects and features of the present invention will become apparent from the following description of preferred embodiments of the present invention taken in conjunction with the accompanying drawings wherein;

FIGS. 10(a)-1, 10(a)-2, 10(b)-1 and 10(b)-2 are flow-charts for showing the third preferred embodiment of the present invention.

DESCRIPTION OF PREFERRED EMBODIMENTS

Figure 1:
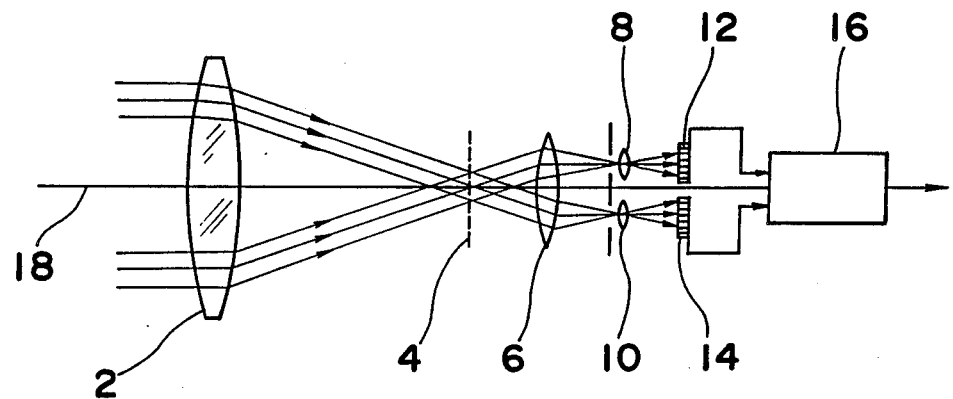
FIG. 1 is an optical system of a typical prior art focus condition detecting device.
Figure 2:
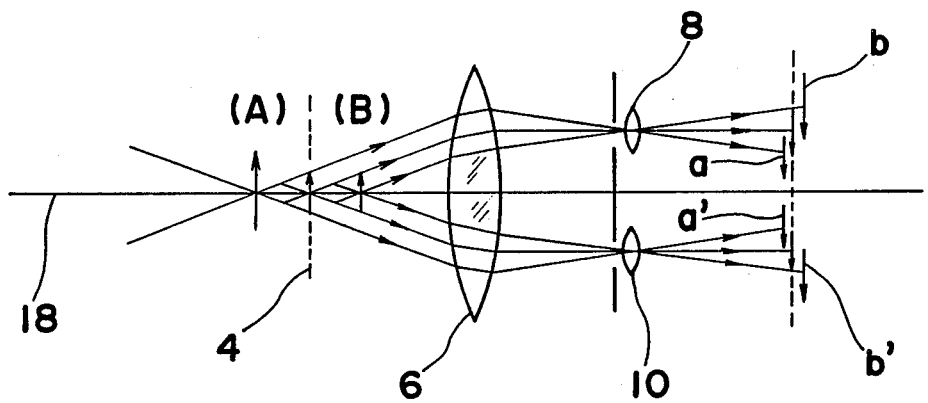
FIG. 2 is an explanative view for showing focus conditions in the optical system of FIG. 1.
Figure 3:
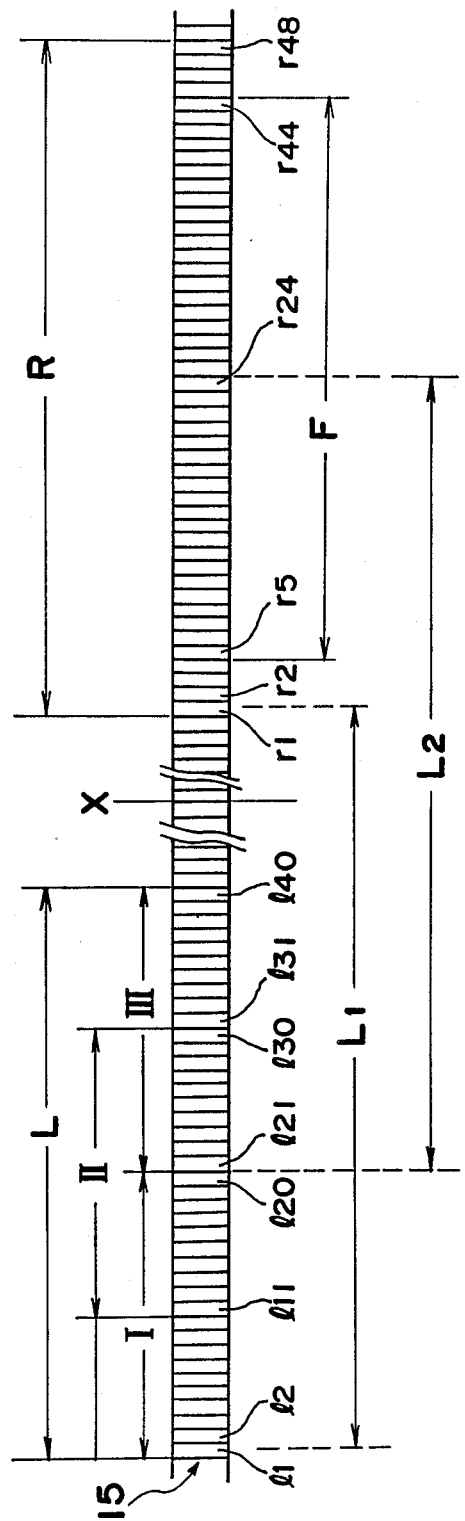
FIG. 3 is an explanation plan view of a line image sensor.
Figure 5:
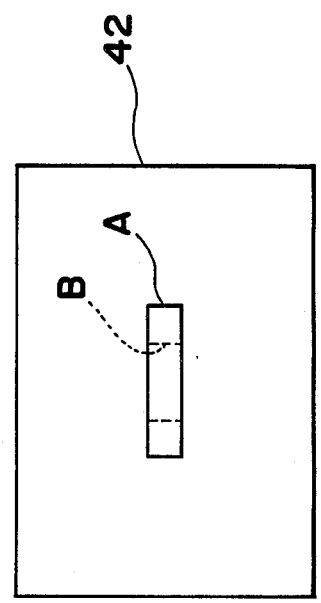
FIG. 5 is an enlarged front view of a field of view of a view-finder for showing two focus detection areas.
Figure 4:
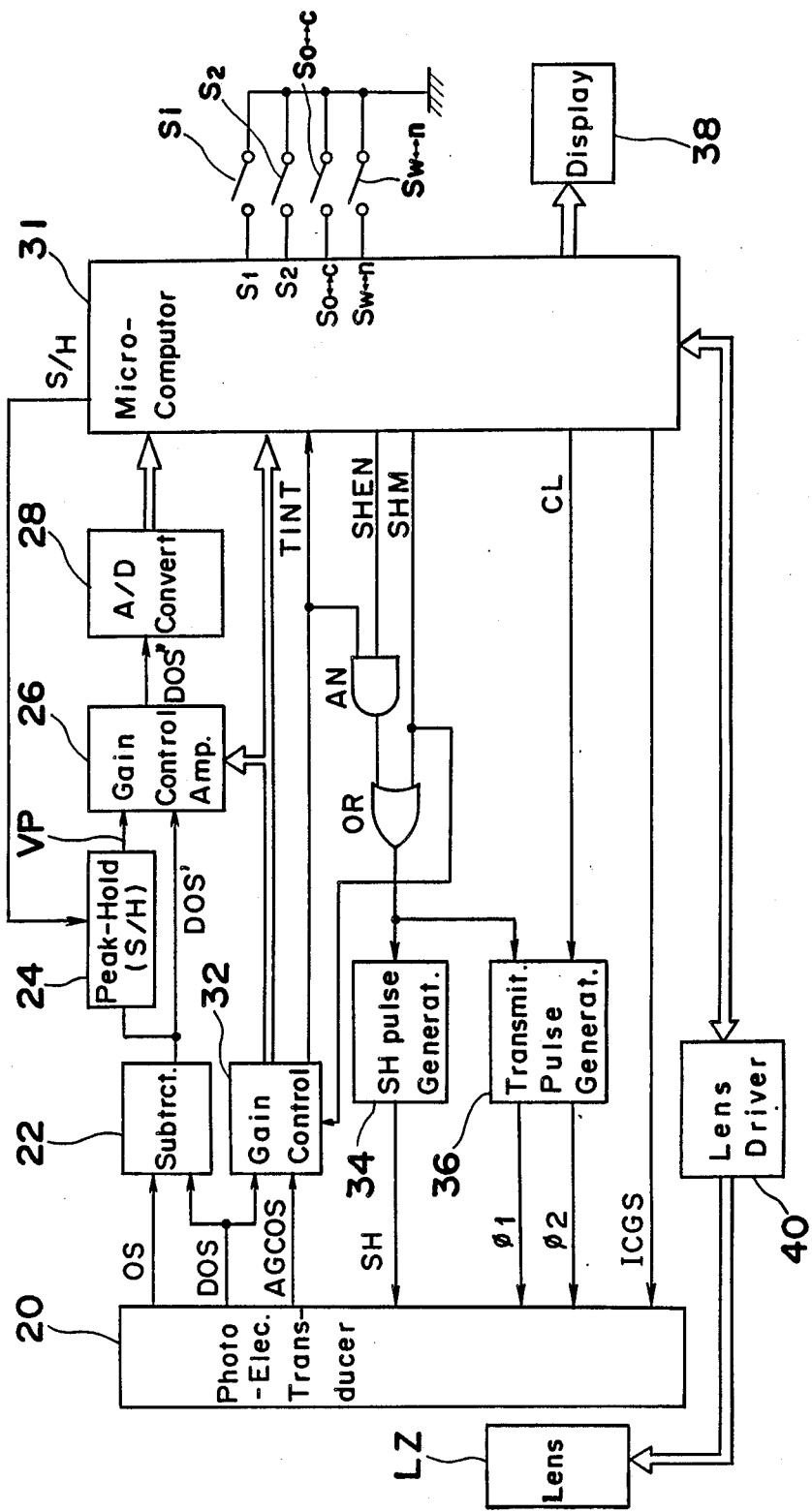
FIG. 4 is a block diagram of an automatic focusing system employing a focus condition detectings device of the present invention.

FIG. 4 shows a block diagram of an automatic focusing system employing a focus condition detecting device of the present invention. Though this block diagram does not include an optical system for focus condition detection, the optical system as shown in FIG. 1 is employed. However, a single line image sensor as shown in FIG. 3 is employed in this automatic focusing system in place of the first and second image sensors 12 and 14 of FIG. 1. In other words, the first and second image sensors 12 and 14 are formed with a first and second portions L and R of the single line image sensor 15. The first portion L being comprised of forty picture elements from $l_1$ to $l_{40}$ is defined as a standard portion. The second portion R being comprised of forty eight picture elements from $r_1$ to $r_{48}$ is defined as a reference portion. A center position X is a position at which the optical axis of the objective lens crosses.

In the standard portion L, there are defined first to third blocks I to III being overlapped with each other. These first to third blocks I to III comprise picture elements from $l_1$ to $l_{20}$, from $l_{11}$ to $l_{30}$ and from $l_{21}$ to $l_{40}$, respectively. There is arranged a monitoring photo-electric element (not shown) just above the standard portion L. As shown in FIG. 3, a distance between the left most picture element $l_1$ of the standard portion L and the picture element $r_1$ of the reference portion R being nearest to the crossing position X of the optical axis is defined as "L".

Further, this optical system employed is designed so that an image having a light intensity distribution equal to that of an image formed on the second block II of the standard portion L might be formed in a range defined between $r_5$ and $r_{44}$ of the reference portion R when the objective lens of the camera is in-focus with respect to an object, namely an object image is formed on the predetermined focal plane thereby. Accordingly, the range defined from the picture element $r_5$ to the picture element $r_{44}$ is defined as "in-focus block" F. And, a distance from the center picture element $l_{21}$ of the standard portion L to the center picture element $r_{24}$ of the in-focus block F is defined as "image distance $L_2$ of in-focus state".

Returning to FIG. 4, when a control circuit (31) constituted by a micro-computer starts a focus condition detecting operation, an integration clear pulse signal ICGS is outputted from the control circuit 31 to the CCD image sensor provided in a photo-electric transducer circuit (20) and having the arrangement as shown in FIG. 3. Due to this signal, all of the picture elements of the CCD image sensor are reset to initial states and an output AGCOS of a brightness monitoring circuit (not shown) provided in the photo-electric tranducer circuit (20) to receive an output of the monitoring photo-electric element referred to above is set up to the level of the voltage of the power source. At the same time, the control circuit (31) outputs a permission signal SHEN of "High" level for permitting a shift pulse generator 34 to generate a shift pulse. As soon as the integration clear signal ICGS disappears, an integration of photocurrent is started in every element of the CCD image sensor. At the same time, the output AGCOS of the brightness monitoring circuit in the photo-electric transducer circuit begins to drop with a velocity corresponding to the intensity of light incident on the monitoring photo-electric element while a reference signal DOS generated by a reference signal generating circuit (not shown) provided in the photo-electric transducer circuit (20) is kept at a constant reference level. A gain control circuit (32) compares the output AGCOS with the reference signal DOS and controls a gain of a differential amplifier (26) of a gain variable type according to the amount of drop of the output AGCOS relative to the reference level DOS within a predetermined time interval (for instance, it is set to 100 m sec upon the focus condition detecting operation). The gain control circuit (32) outputs a signal TINT of "High" level as soon as it detects that AGCOS signal has dropped to a level equal to or lower than a predetermined level against the reference level DOS within the predetermined time interval starting from the disappearance of the integration clear signal ICGS. The signal TINT is input to a shift pulse generating circuit (34) via an AND gate (AN) and an OR gate (OR) and the shift pulse generating circuit (34) outputs a shift pulse SH in response thereto. When the shift pulse SH is input to the photo-electric transducer circuit (20), the integration operation of photo-current by each light sensing element (picture element) of the CCD image sensor is stopped and, then, charges accumulated in each light sensing element and corresponding to integrated values of the photo-current are transmitted parallel to cells in a shift register provided in the CCD image sensor so as to correspond one to one to the light sensing elements of the CCD image sensor.

Further, a transmission pulse generating circuit (36) outputs two sensor driving pulses $\Phi 1$ and $\Phi 2$ having phases different from each other by 180° in a manner synchronized with clock pulses CL from the control circuit (31). The CCD image sensor in the photo-electric transducer circuit (20) outputs signals OS forming image signals representing the light intensity distributions on the standard and reference portions L and R by discharging a charge of each cell of the CCD shift register serially in the order of alignment of elements. Each OS signal has a higher voltage as an intensity of incident light to a corresponding element is weaker. A subtraction circuit (22) subtracts OS signals from DOS signal and outputs the differences (DOS-OS) as picture element signals DOS'.

On the contrary to the above, if the predetermined time interval has elapsed without receipt of a TINT signal after the disappearance of the ICGS signal, the control circuit (31) outputs an instruction signal SHM for generating a shift pulse of "High" level. Therefore, in this case, the shift pulse generating circuit (34) generates a shift pulse SH in response to this instruction signal SHM.

Further, the control circuit (31) outputs a sample-hold signal S/H when element signals from seventh to tenth picture elements of the CCD image sensor are outputted. The area of the CCD image sensor corresponding to these elements is covered with an aluminum mask, so that these elements integrate only dark currents inherent to the CCD image sensor. Namely, these picture elements are shutted from the incident light. A peak hold circuit (24), when the sample hold signal S/H is applied thereto, holds a difference VP between the reference signal DOS and one of picture element signals from the seventh to tenth elements covered with the aluminum mask. Thereafter, the difference VP and the picture element signals DOS' are input to the gain variable amplifier (26). That gain variable amplifier (26) amplifies difference (VP-DOS') between VP and DOS' with a gain controlled by the gain control circuit (32). The amplified signals DOS'' are converted from analogue data to digital data by an A/D converter (28) and digital data are applied to the control circuit (31) as picture element signal data. Though the A/D conversion by the A/D converter is done in a unit of 8 bits, data are transmitted to the control circuit in each lump of top four bits and bottom four bits.

The control circuit (31) stores these picture element signal data in an internal memory thereof and, when all of element signal data have been stored therein, processes those data according to programs set therein to calculate a defocus amount and a direction of defocus, to display these data on a display (38) and to drive a lens driving device (40) according to the defocus amount and the direction thereof in order for auto-focusing adjustment of the objective lens.

Data with respect to the focus condition of the objective lens obtained by the calculation operation of the control circuit 31 are a defocus amount and defocus direction. Based on this data, a driving amount and direction of the objective lens to be driven by the lens driving device 40 are determined. While the lens driving device 40 drives the objective lens according to the driving amount and direction, it outputs signals corresponding to the actual driving amount of the objective lens. The control circuit 31 detects the actual driving amount from the signals and, when it becomes equal to the determined driving amount, outputs a signal for stopping the lens driving to the lens driving device.

Further, four switches $S_1$, $S_2$, $S_o \longleftrightarrow c$ and $S_w \longleftrightarrow n$ are connected to the control circuit 31. The switch $S_1$ is a switch for starting the AF (auto-matic focus adjusting) mode when switched ON and, when switched OFF, the AF mode is suspended. The switch $S_2$ is a switch for starting a shutter release operation. When the switch $S_2$ is switched ON, the focus detection operation is suspended for a while to wait a mirror up and down operation for a shutter release. The switch $S_o \longleftrightarrow c$ is a switch for switching a one-shot AF mode to a continuous AF mode or vice versa. The one-shot AF mode is set when the switch $S_o \longleftrightarrow c$ is switched ON and, when switched OFF, the continuous AF mode is set.

As explained already, the continuous AF mode is a mode wherein auto-focus adjustments are repeated. On the contrary to the above, in the one-shot AF mode, the auto-focus adjusting operation is ended to lock a focusing state once the objective lens has been located at an in-focus position detected. Therefore, this one-shot AF mode is to be selected when a target object is stationary.

The switch $S_w \longleftrightarrow n$ is provided for switching the focus detection area from a wide area A to a narrow area B or vice versa. In the present preferred embodiment, the narrow focus detection area B is chosen when the switch $S_w \longleftrightarrow n$ is switched ON, and, when switched OFF, the wide focus detection area A is chosen.

Before starting an explanation about operations by the auto-matic focus adjusting device, a method for a correlation calculation and a method for an interpolation calculation will be explained.

The correlation calculation is executed with use of output signals from picture elements $l_1$ to $l_{40}$ and $r_1$ to $r_{48}$.

Assuming now every reference symbol such as $l_1$ or $r_1$ indicating each picture element represents an output signal data of eight bits from the A/D converter. These data are transformed into differential data $Dl_i$, $Dr_j$ with use of every fourth data (namely, $Dl_i = l_i - l_{i+4}$; $i = 1 \sim 36$, $Dr_j = r_j - r_{j+4}$; $j = 1 \sim 44$). This transformation is made for reducing affects due to high spatial frequency components included in every output data.

Then, a value of contrast is calculated according to a following equation;

$$C = \sum_{k=1}^{35} |Dl_k - Dl_{k+1}|$$

Next, every correlation function $H(I)$ ($I = 1 \sim 9$) is calculated according to a following equation;

$$H(I) = \sum_{k=1}^{35} |Dl_k - Dr_{k+I-1}|.$$

As mentioned above, th correlation function $H(I)$ has a minimum value if a degree of correlation between the standard portion L and a detection range of the reference portion R which is identified by a number I becomes maximum among of them.

Therefore, a value of I which gives a maximum correlation is sought by finding a minimum value among values of correlation functions $H(I)$ calculated. If the value I having been sought is equal to five ($I = 5$), the focus condition at that time is just in an in-focus state. In a case wherein it is smaller than five, the focus condition is in a front focus state and, if larger than 5, the focus condition is in a rear focus state.

However, the correlation calculation mentioned above is made in the unit of a pitch between adjacent picture elements and, therefore, includes an uncertainty by one pitch at the maximum. The interpolation calculation is performed to obtain a much more exact value.

This interpolation calculation is performed as follows.

Figure 6:
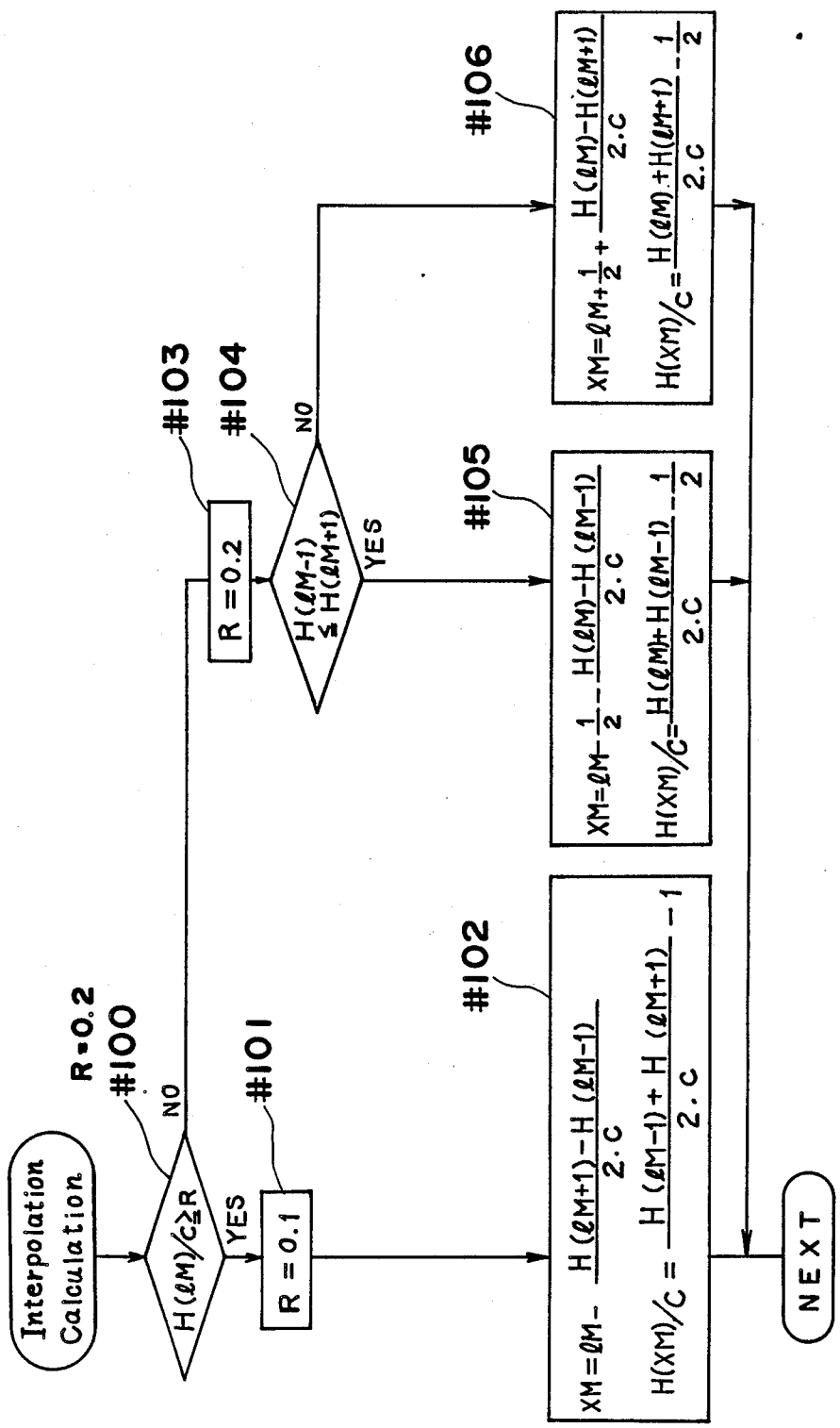
FIG. 6 is a flow-chart showing a metnod for an interpolation calculation for focus condition detection effected in the focus condition detecting device of the present invention.

FIG. 6 shows one method of the interpolation calculation. At first, the minimum value H(lM) having been sought by the correlation calculation is normalized with use of the value C of contrast (H(lM)/C). Then, the normalized value is compared with a reference value R. This value R is set for deciding whether H(lM)/C has a high credibility or not. In the present embodiment, R is initially set to 0.2.

As shown in FIG. 6, it is decided at step #100 whether the value of H(lM)/C is equal to or larger than R.

If it is smaller than R, the value of R is again set to 0.2 at step #103 and, then, the program proceeds to step #104 for deciding whether H(lM+1) is equal to or larger than H(lM−1).

If H(lM+1) is equal to or larger than H(lM−1), a value XM which gives a most probable minimum value of the correlation function H(I) is sought at step #105 by an interpolation calculation according to a following equation;

$$XM = lM - \frac{1}{2} - \frac{H(lM) - H(lM-1)}{2C}$$

If H(lM−1) is larger than H(lM+1), XM is sought with use of a following equation;

$$XM = lM + \frac{1}{2} + \frac{H(lM) - H(lM + 1)}{2C}$$

This interpolation calculation is based upon an assumption that, in an ideal state wherein every output li of the standard portion L is equal to corresponding one $r_{i+4}$ of the reference portion R, inclinations of the correlation function before and after a minimum point thereof have an angle of 45° to a horizontal axis respectively and cross orthoganally with each other at the minimum point. In this ideal state, every differential data Dli of the standard portion L is equal to corresponding one $Dr_{i+4}$ of the reference portion R. Therefore, the minimum value of the normalized correlation function in the ideal state is given by a following equation;

$$H(5)/C = \left( \sum_{k=1}^{36} |Dl_k - Dr_{k+4}| \right)/C$$

and, front and rear values adjacent to the minimum value are given by following equations, respectively;

$$H(4)/C = \left( \sum_{k=1}^{36} |Dk_k - Dr_{k+3}| \right)/C$$
$$= 1 + |Dl_1 - Dr_4|/C$$

$$H(6)/C = \left( \sum_{k=1}^{36} |Dl_k - Dr_{k+5}| \right)/C$$
$$= 1 + |Dl_{36} - Dr_{41}|/C$$

Accordingly, the assumption of the ideal state mentioned above is considered to be correct as far as values of $|Dl_1 - Dr_4|$ and $|Dl_{36} - Dr_{41}|$ are sufficiently small when compared with the value of contrast C.

On the contrary to the above, if the value of H(lM)/C is equal to or larger than R(=0.2), the program proceeds to step #101 to renew R to 0.1.

In this case, the value of H(lM)/C is considered to have a poor credibility because of some reasons such as electric noises and/or bad affections due to a confliction of close and remote target objects. Therefore, the minimum value H(lM)/C is neglected in an interpolation calculation and, in place of that, values adjacent to the minimum value are used therefor. The interpolation calculation is performed, in this case, according to a following equation as shown in a box of step #102.

$$XM = lM - \frac{H(lM + 1) - H(lM - 1)}{2C}$$

Considering a possibility that values obtained by the interpolation calculation at a level of threshhold may be fluctuated, there is provided such a hysteresis that, once the latter interpolation method has been employed, it is repeated until the value H(lM)/C becomes equal to or larger than R(0.2).

Further, it is to be noted that a value of the normalized correlation function for the value XM is also calculated at either of steps #102, #105 and #106.

Next, a main routine program to be executed by the control circuit 31 according to the present invention will be explained referring to FIG. 7.

When a power switch (not shown) of the camera is switched ON, the program waits at step #1 until the switch $S_1$ for starting the AF operation is switched ON. This switch $S_1$ is switched ON when a shutter release button is pushed down by a half stroke thereof.

The control circuit 31 initializes the photo-electric transducer 20 and, then, the line image sensor starts an integration (charge accumulation) to obtain data representing light intensity distributions of the images formed on the standard and reference portions L and R at step #32. When the AGCOS signal has dropped to the predetermined level, the control circuit 31 stores data outputted from each picture element of the line image sensor into a RAM of the micro-computer after A/D conversion by the A/D conventor at step #3. Namely, data are dumped to the control circuit thereat. At step #4, differential data $Dl_1 \sim Dl_{36}$ and $Dr_1 \sim Dr_{44}$ are calculated with the use of picture element data $l_1 \sim l_{40}$ and $r_1 \sim r_{48}$ each of which is formed with eight bits.

After the completion of this preliminary preparation for the correlation calculation, the control circuit checks the position of the switch Sw←→n for switching the focus detection area at step #5-0. If the narrow focus detection area B is chosen, namely the switch Sw←→n is switched ON, the control circuit 31 sets "16" and "11" as a number of data to be used for a correlation calculation and a starting number S of differential data into predetermined areas of an internal memory means thereof at step #5-2, respectively. These numbers "16" and "11" are so determined as to correspond to the narrow focus detection area B. Further, a predetermined value CS1 is set as a lower limit CS of the contrast.

If the switch Sw←→n is kept OFF, namely the wide focus detection area A is chosen, the control circuit 31 sets "36" (which is equal to a total number of differential data) as the number d of data to be used for a correlation calculation, "1" as the starting number of the differential data and a predetermined value CS2 as the lower limit CS of the contrast at step #5-1, respectively.

Then, at step #5-3, the control circuit 31 calculates a contrast C and the correlation function according to equations defined in the box of step #5-3 by changing k from 1 to 9. The values of S and d in the equations are set according to the values having been set at step #5-1 or #5-2 depending on the state (ON or OFF) of the switch Sw←→n.

Thus, conditions depending on the width of the focus detection area are taken into the focus condition detection as is apparent from the explanation above.

Then, a minimum value of the correlation function is sought among values of the correlation functions thus obtained at step #6, and an interpolation calculation according to the method as mentioned above is executed to obtain the most probable distance XM between two images formed on the standard and reference portions L and R at step #7.

At step #8, the image distance XM thus obtained is subtracted with the standard image distance XJ to seek for an amount P of deviation of the image distance from the standard image distance ($L_2$). This deviation amount P is proportional to a defocus amount at that time.

Next, at step #9, the credibility of the deviation amount P obtained is checked.

The credibility check is made with use of conditions as follows;

(i) A value of the contrast C should be equal to or larger than a predetermined value which is equal to CS in this preferred embodiment.

(ii) A maximum value among the outputs of the picture elements of the line image sensor should be equal to or larger than a predetermined value Ps.

(iii) The value ln which gives the minimum value of the correlation function should not be located at the front or rear-most end portion of the shift range ($k \neq 1$ or d).

(iv) The minimum value of the normalized correlation function $(H(XM)/C) = YM/C$ should be equal to or smaller than a predetermined value YMs.

When all of four conditions are satisfied, the deviation amount P of image distance is transformed into a defocus amount DF at step #13 since it has a reasonable credibility. The defocus amount DF is further transformed into a lens drive amount according to which the objective lens is to be driven at step #14. Then, it is decided at step #15 whether the objective lens is located within an in-focus range or is to be driven according to the lens drive amount obtained.

If it is decided that the objective lens is located within the in-focus range already, this is displayed by a display device provided in the camera at step #17.

If the objective lens is out of focus, it is driven by the lens drive amount having been obtained at step #16 and, then, the program returns to step #2 in order to start again an integration operation by the line image sensor and a focus condition detection by the control circuit 31.

Once an in-focus state has been displayed, the program proceeds to step #18 in order to check the state of the switch So←→c.

If this mode switching switch So←→c has been switched ON, namely one-shot AF mode has been chosen, an automatic focus adjusting operation is finished holding the objective lens at the in-focus position.

If the switch So←→c is switched OFF, namely, the contineous AF mode is chosen, the program returns to step #2 in order to repeat automatic focus adjusting operation.

On the contrary to the above, if either of those four conditions (i) to (iv) is not satisfied, since this suggests that data obtained have not a satisfactory credibility, the program proceeds to step #11 in order to start a low contrast scan which is carried out for moving the objective lens over a full drive range thereof.

If it is decided at step #10 that data having a reasonable credibility has not been obtained even when the low contrast scan has been completed, the lens drive is stopped and characters "LO-CON" indicating that the contrast of a target image is too low to detect a focus condition are displayed on the display at step #12.

As explained in detail, according to the present preferred embodiment, the state of the switch Sw←→n for switching the focus detection area is checked before starting the correlation calculation, and the number d of differential data, starting number thereof and value of thresh-hold CS for finding a low contrast state are set according to the state of the switch Sw←→n, and the correlation calculation and decision of low-contrast are carried out according to data having been thus set. Thus, the automatic focus adjusting operation can be made according to a choice of the focus detection area.

In a second preferred embodiment of the present invention, there is provided a switch which serves both as the switch Sw←→n for switching the focus detection area and the switch So←→o for switching the one-shot AF mode to the continuous AF mode or vice versa. Further, there is set a relation between the AF mode and the focus detection area as follows; the wide focus detection area A is automatically selected when the continuous AF mode is chosen and, when the one-shot AF mode is chosen, the narrow focus detection area B is automatically selected.

As already explained, since the continuous AF mode is utilized mainly in the case that an target object is moving, it becomes necessary to catch the moving object within the focus detection area, otherwise the automatic focus adjustment is made while aiming at a back ground of the main target object. Due to this reason, it is effective to select the wide focus detection area as far as the continuous AF mode is chosen.

On the contrary to the above, the one shot AF mode is usually chosen in the case of a stationary target object. In this case, it is easy to catch a stationary object within the focus detection area even if it is the narrow focus detection area B. Also the probability of aiming at a back ground in the focus condition detection will be reduced if the narrow focus detection area B is used. Therefore, the narrow focus detection area B is suitable for the one shot AF mode.

Figure 7A:
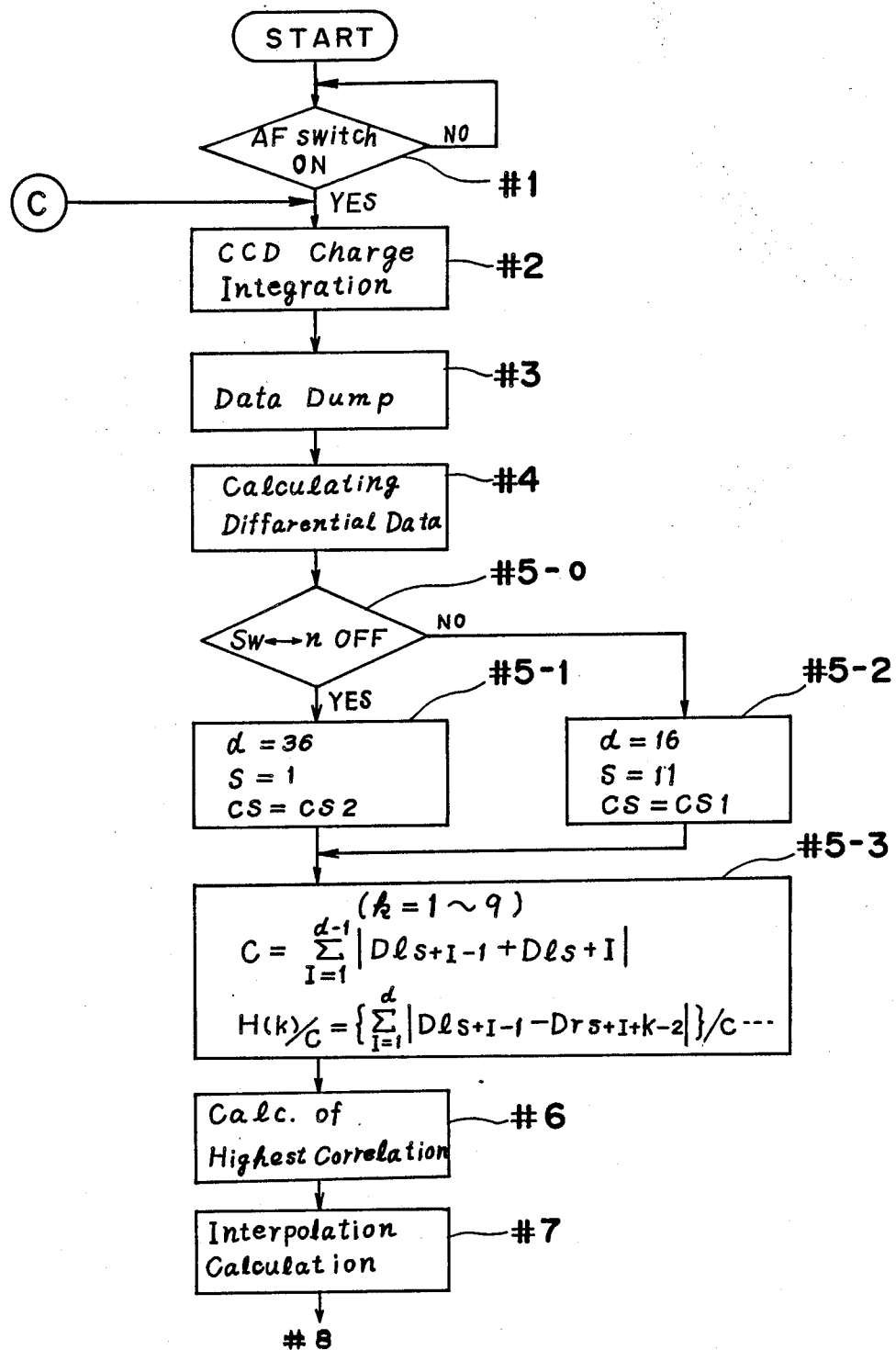
FIGS. 7(a) and 7(b) are flow-charts showing the first preferred embodiment of the present invention.
Figure 8:
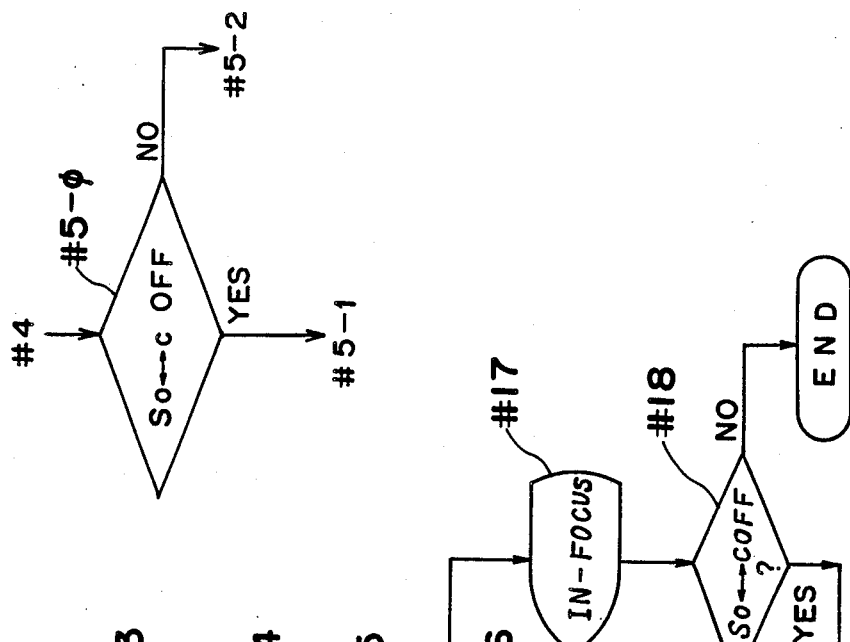
FIG. 8 is a decision box for showing a variation of the first preferred embodiment.

The second preferred embodiment is easily realized by substituting a decision box shown in FIG. 8 for the decision box #5-0 of FIG. 7.

Namely, if the mode switching switch So←→o is switched OFF to chose the continuous AF mode, the program proceeds to step #5-1 of FIG. 7 and, thereat, the focus detection area is set to the wide focus detection area A. It it is switched ON to chose the one shot AF mode, the program proceeds to step #5-2 of FIG. 7 to set the focus detection area to the narrow focus detection area B. In this second preferred embodiment, therefore, the switch Sw←→n for switching the focus detection area can be omitted.

According to the second preferred embodiment, it becomes easy in the continuous AF mode to take a photograph of a moving object chasing it with the wide focus detection area A. Further, in the one-shot AF mode, the accuracy in the auto-matic focus adjustment is increased as far as a stationary object is concerned because of the limited narrow focus detection area.

Next, a third preferred embodiment of the present invention will be explained referring to FIG. 9 which shows a flow-chart therefor.

In the third preferred embodiment, there are utilized the first to third blocks I, II, III defined on the standard portion L of the line image sensor as explained with respect to FIG. 3 already. Data to be used when either one of the first to third blocks is chosen for a focus condition detection are shown in a table herein attached.

TABLE

| | Area of Pic Element | Diff. Data | Left Most Elem. for Corr. Calc. | Dect. Area for Image Dist. Error (Max) |
|---|---|---|---|---|
| Stand. Port. (L) | | | | |
| First Block (I) | $l_1 \sim l_{20}$ | $lS_1 \sim lS_{16}$ | r5 (rS 5) | $-4 \sim 14$ pitch |
| Second Block (II) | $l_{11} \sim l_{30}$ | $lS_{11} \sim lS_{26}$ | r15 (rS 15) | $-8 \sim 8$ pitch |

TABLE-continued

| | Area of Pic Element | Diff. Data | Left Most Elem. for Corr. Calc. | Dect. Area for Image Dist. Error (Max) |
|---|---|---|---|---|
| Third Block (III) Ref. Port. (R) | $l_{21} \sim l_{40}$ | $lS_{21} \sim lS_{36}$ | r25 (rS 25) | $-14 \sim 4$ pitch |
| All | $r_1 \sim r_{48}$ | $rS_1 \sim rS_{44}$ | | |

Referring now FIG. 9, when the program is started, the second block II on the standard portion L is designated at first as a starting block (or zone) for a focus condition detection and a flag ZF for indicating whether a limitation with respect to a range for a focus condition detection is made or not is reset at step #20. The program waits at step #1 until a start signal for starting an automatic focus adjusting operation is entered.

When the switch $S_1$ is switched ON to start an automatic focus adjusting operation, the image line sensor 15 is initialized at first and, then an integration (charge accumulation) operation thereby is started at step #2. When the integration operation has been completed, accumulated charges in individual picture elements are transmitted serially to the analogue shift register synchronized with shift pulses and, then, charge transmission and data dumping are done synchronized with transmission clock pulses $\phi_1$ and $\phi_2$ at step #3. When all of the data of the picture elements of the image line sensor have been dumped, those data are transformed into differential data at step #4.

After the calculation of differential data, the state of the switch Sw$\longleftrightarrow$n for switching the focus detection area is checked in order to decide whether the focus detection area is limited to the narrow area B or not at step 20.

If the state of the switch Sw$\longleftrightarrow$n is OFF, namely the wide focus detection area A is chosen, a block counter j for counting a number of blocks to be used is set to "3" in order to carry out a focus condition detection with use of full range of the standard portion L, namely all of the first to third blocks, at step #21.

On the contrary to the above, if the state of the switch Sw$\longleftrightarrow$n is ON, namely the narrow focus detection area B is chosen, the block counter j is set to "1" and a block indication number n is set to "2" at step #22, in order to carry out a focus condition detection with use of only the second block II.

Then, the program proceeds to step #29, so that the control circuit executes the calculation of the correlation function, passing through steps #23 to #27 since n=2, ZF=0. At step #29, values of the correlation function are calculated with use of the second block II shifting the value k from 1 min (=6) to 22. An image distance 1M2 which gives a minimum value among the values of the correlation function $(H_2(k)/C_2)$, namely a maximum correlation relation, is found at step #30. Using the value of 1M2, $H_2(1M2)/C_2$, $H_2(1M2-1)/C_2$ and $H_2(1M2+1)/C_2$, an interpolation calculation is executed to obtain an interpolated image distance XM2 and an interpolated minimum value $H_2(XM2)/C_2$ of the correlation function at step #31.

Then, at step #32, it is decided based upon these values obtained whether they have a reasonable credibility or not (low-contrast or not).

If they have a reasonable credibility, a deviation amount P2 of image distance is calculated with use of XM2 obtained at step #31 and is memorized into the internal memory means.

The deviation amount P2 of image distance thus obtained, if the value XM2 has a reasonable credibility, is used as a reference value for comparing a deviation amount of image distance which is obtained with the use of another detection block (the first or the third block). In the present preferred embodiment, the correlation calculation is made with respect to only a detection block which might give a deviation amount larger than the deviation amount P2 in order to speed up the focus condition detection calculation.

In order for that, the limit flag ZF is set to "1" and a value of (1M2-15) is memorized into a memory as a limit value Pmin at step #34. This is due to the reason that values of the correlation function at the shift values shifted by one pitch of picture elements from the shift value providing the minimum correlation function are needed for an interpolation calculation. The method for the interpolation calculation and that for decision of the low contrast state are the same to those already explained with respect to FIGS. 6 and 7.

Then, the block counter (routine counter) is checked. If the switch Sw$\longleftrightarrow$n is in the ON state and, therefore, only the second block II is designated for a focus condition detection, a count value of the block counter (which is set to "1") becomes "0" by subtracting it by one at step #35. Accordingly, the program proceeds from step #36 directly, without any further detection calculation, to step #38 in order to carry out a subroutine for a driving lens.

On the contrary to the above, if the switch Sw$\longleftrightarrow$n is in the OFF state and, therefore, the wide focus detection area A is chosen, a count value of the block counter was set to "3" initially as mentioned above and is decremented by one at step #35 (j=2). And, the block indicating number n is incremented by one at step #37 (n=n+1=3) to designate the third block III for a next focus condition detection operation. Accordingly, the program proceeds from step #25 to step #41 to start the next focus condition operation with use of the third block III.

It is was decided at step #32 that all of the conditions for deciding a low contrast state were cleared, the correlation calculation with use of the third block III is executed using only the deviation amounts being larger than the deviation amount P2. If it was decided at step #32 to be in a low contrast state with respect to the correlation calculation with use of the second block II, the correlation calculation with the use of the third block III is executed using of all the shift range being available for the third block III irrespective of the deviation amount P2.

Then, a maximum correlation relation is sought at step #45, values of $XM_3$, $H_3(XM_3)/C_3(XM_3)$ are calculated according to the method for interpolation calculation at step #46, a decision about "LO-CON" is made at step #37, a deviation amount P3 of image is memorized at step #48 (if the contrast of object image in this block is not low) and a limit shift value Pmin (+1M3-25) is memorized and the flag ZF is set to "1" at step #49. Although it may be considered that P3 sought at this stage is smaller than P2 by a difference within one pitch of the picture element, the value of Pmin in this case becomes equal to Pmin obtained at step #34 but does not become smaller than Pmin obtained at step #34.

When all of the calculations with respect to the third block III have been completed, the block indication number n is incremented by one (n=n+1=4) at step #37 in order to designate the first block I. And, the correlation calculation with use of the first block I is excuted from step #50 to step #59.

As apparent from the explanation above, in the case that the wide focus detection area is selected, each correlation calculation is executed using deviation amounts of image larger than the deviation amount ($P_2$ or $P_3$) of image having been obtained by the correlation calculation with use of the preceding block. And, when all of the correlation calculations with use of the first to third blocks I, II and III have been completed a count number j of the block counter becomes zero and the program proceeds to step #39 in order to start the lens drive routine.

Figure 7B:
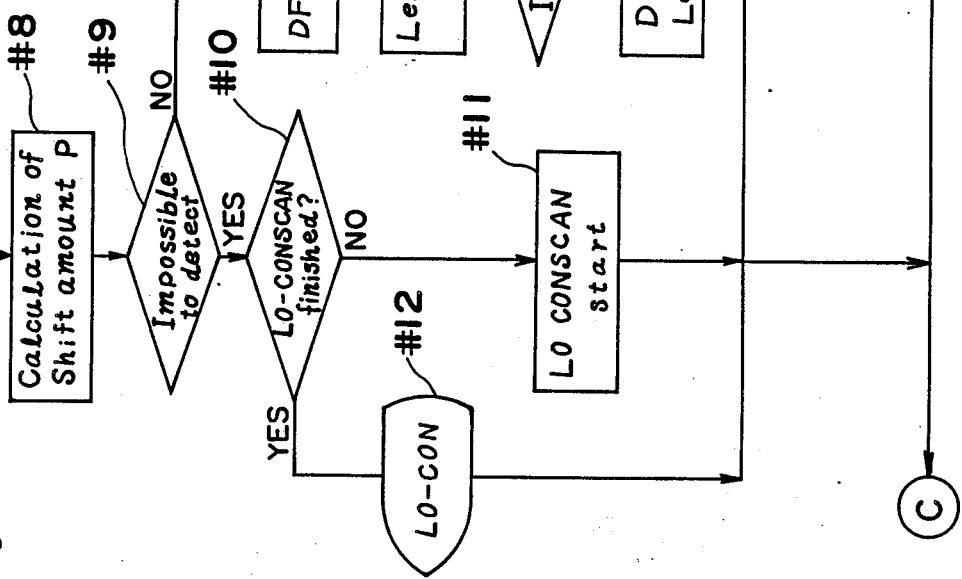

A flow after the lens drive routine #38 is essentially identical to that of FIG. 7(b) irrespective of the state (ON or OFF) of the switch Sw←→n.

At first, it is decided at step #39 whether there was any one block which was not in a low constrast state. It is to be noted here that, if the switch Sw←→n is in the ON state to select the narrow focus detection area wherein only the second block II is designated for the focus condition detection, the decision at step #39 is done with respect the second block II.

If all of the first to third blocks I–III are in a low contrast state respectively, the objective lens is driven for "LO-SCAN" wherein the focus condition detection is repeated while driving the objective lens so as to pass the whole range from the nearest position to the farthest position thereof at least one time. During the "LO-CON SCAN", the focus condition detection operations are carried out several times. If every result obtained by these operation shows a low contrast state, the objective lens is stopped at either of the farthest and the nearest focus position after the "LO-CON SCAN" has been completed. As far as the AF switch S1 is kept in the ON state, the integration operation by the image sensor and the focus condition detection calculation is repeated to wait for an appearance of an object having a proper contrast while continuing the display of "LO-CON".

If there is detected at least one block having a reasonable contrast, a block number n of a block which gives a maximum image distance, namely a block on which an image of a target object locating at the nearest position is formed and a deviation amount Pi of image are found at step #40. The deviation amount Pi of image distance is transformed into a corresponding defocus amount DF by multiplying Pi with a constant $a$ (DF=$a$Pi) at step #13, and the block number (n=i) is memorized. The defocus amount DF is transformed into a lens drive amount by multiplying it with a transformation coefficient proper to an individual objective lens, at step #14. If the lens drive amount obtained is sufficiently small, in other words, the objective lens is already located in an in-focus zone thereof, "In-focus" is displayed on the display of the camera. If not, the objective lens is driven according to the lens drive amount at step #16 and then an integration operation by the image sensor and a focus condition detection calculation are executed again to check whether the objective lens has been driven to the in-focus zone by driving the objective lens.

When the objective lens is located in the in-focus zone the program proceeds to step #17 to display "In-focus" and then to step #18 to check the state of the switch So←43 c. If the one-shot AF mode is selected, the program goes to END while holding the display of "In-focus". If the continuous AF mode is selected, an integration operation by the image sensor and a focus condition detection calculation are executed again similarly to the case of an out-of-focus state.

As is apparent from the explanation above, according to the present preferred embodiment, a block number of a block which gives a maximum image distance in the preceding focus condition detection operation is memorized and, upon the next focus condition detection operation, the block being identified by said block number n memorized is designated for the first time. This is effective to speed up the next focus condition detection calculation since a probability that the block designated by the block number n gives also a maximum correlation in the next focus condition detection calculation is high.

Further, a responsibility in the automatic focus condition adjustment is much improved since the number of data to be calculated in the focus condition detection is reduced considerably if a block which gives a maximum image distance upon the first focus condition detection calculation is selected for the correlation calculation for the next focus condition detection calculation.

Next one more preferred embodiment of the present invention will be explained referring to FIGS. 10(a)-1, 10(a)-2, 10(b)-1 and 10(b)-2.

In this preferred embodiment a block number of a block which gives a maximum image distance upon the first focus condition detection calculation is memorized and a second focus condition detection calculation is executed using the block identified by the block number designated and shift amounts to be used therefore are restricted only to a narrow range including a shift amount giving the maximum image distance in the first focus condition detection calculation. And, if the result obtained by the second focus condition detection calculation has a reasonable credibility, the objective lens is driven according to said result without executing any further detection calculation.

Figure 9A:
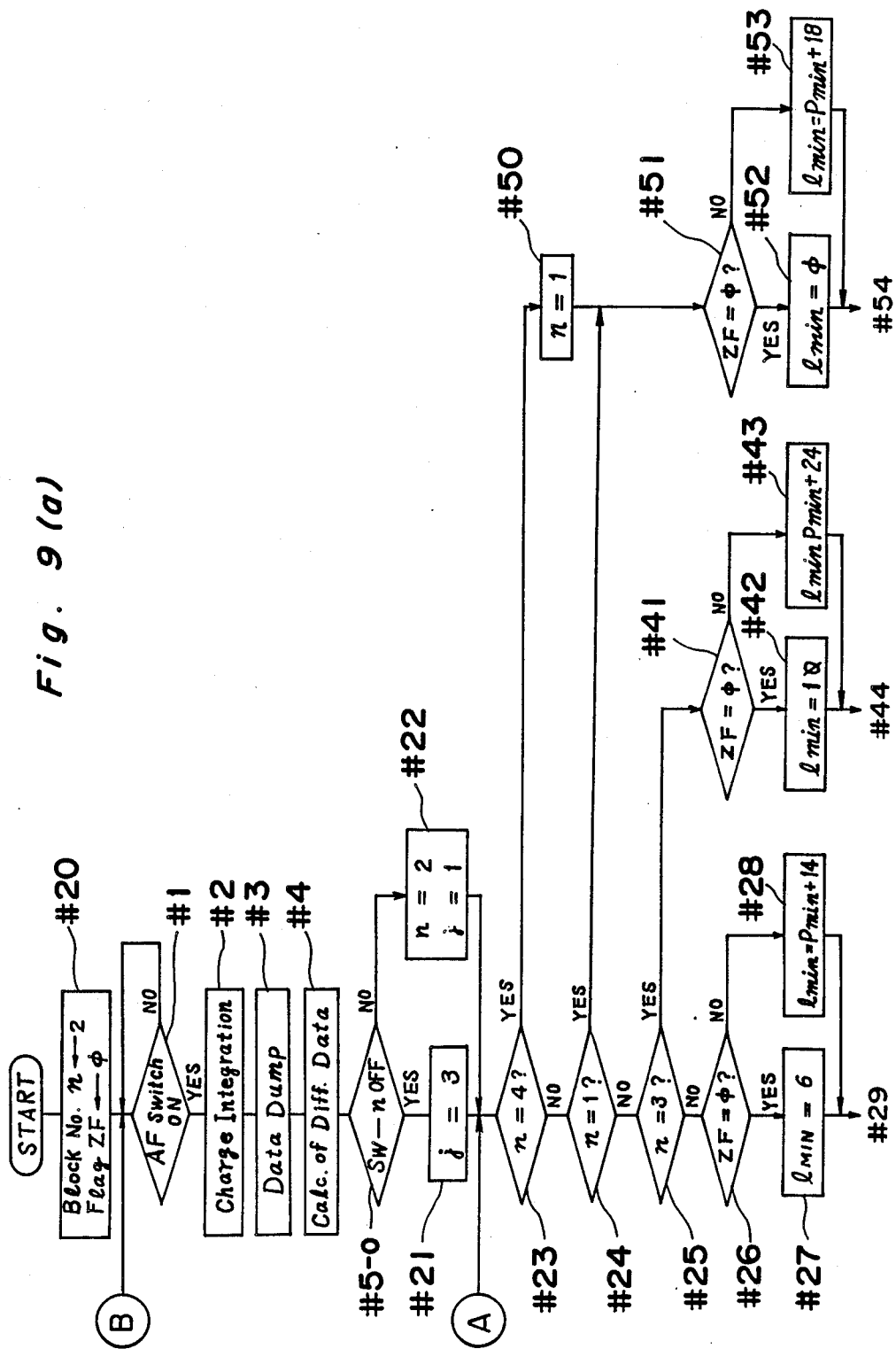
FIGS. 9(a), 9(b) and 9(c) are flow-charts for showing the second preferred embodiment according to the present invention.
Figure 9B:
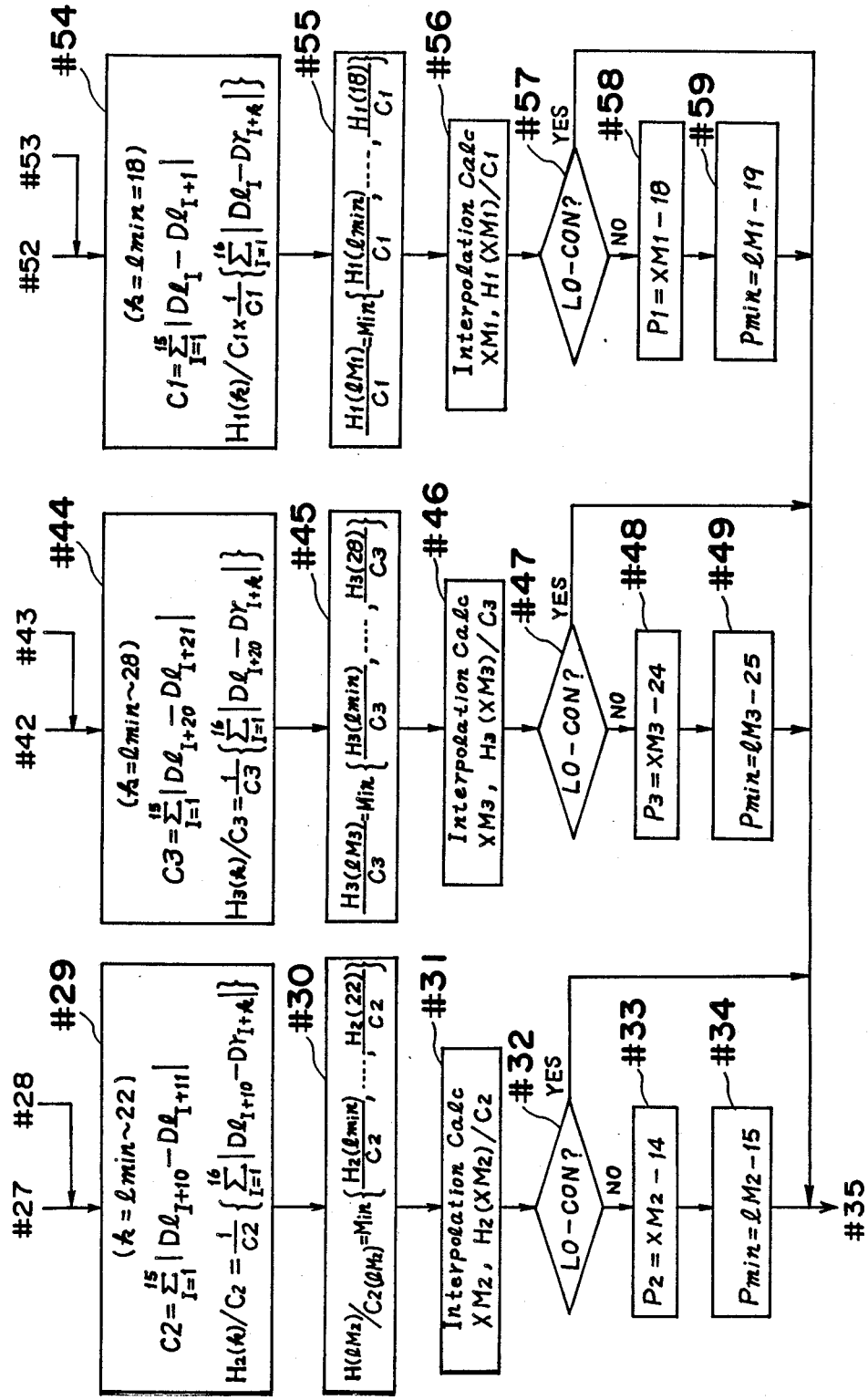
Figure 9C:
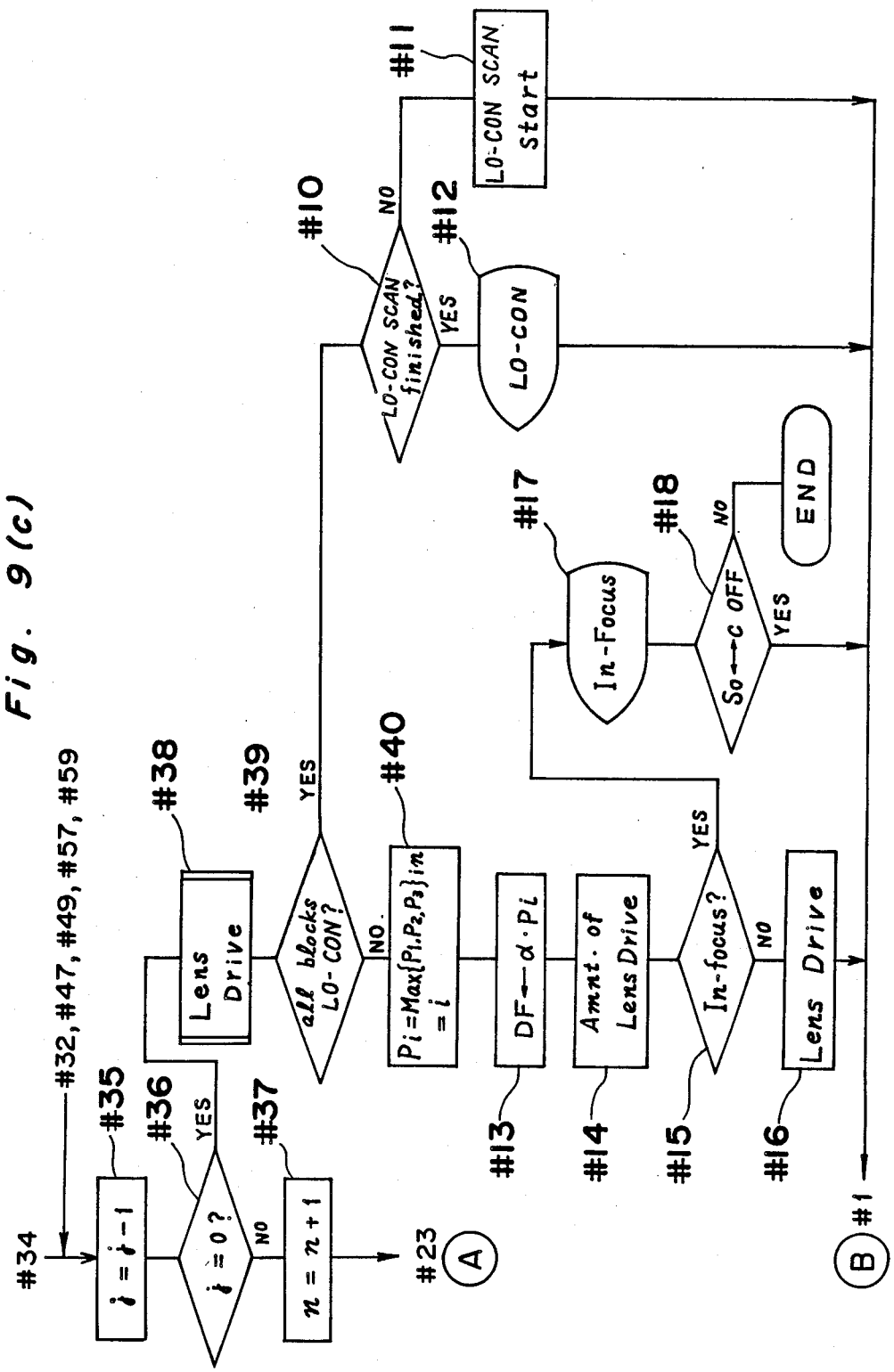

As is apparent from the comparison of FIGS. 10(a)-1, 10(a)-2, 10(b)-1 and 10(b)-2 with FIGS. 9(a), 9(b) and 9(c), the first focus condition detection calculation is executed in a manner identical to that of the third preferred embodiment. After the objective lens has been driven according to the defocus amount obtained in the first detection calculation (steps #13 to #16), a lens drive finish flag AF is set to "1" at step #72 which is newly introduced to indicate a finish of a lens drive in this preferred embodiment and which has been initialized to zero at starting step #20. It is to be noted that this flag AF, when set to "1", indicates that the objective lens might be located near to an in-focus position thereof with a high probability.

Thereafter, the integration operation by the line image sensor and the focus condition detection calculation are repeated.

However, in a second focus condition detection calculation, a range of shift amounts is restricted to a narrow range as far as the lens drive finish flag AF has been set to "1" which may be forecasted taking such a high probability as mentioned above into consideration. Therefore, as shown at step #62, the correlation calculation is executed with the use of only five shift amounts ranging from (−2)nd pitch to (+2)nd pitch with the maximum image distance in the center.

. It either one of three shift amounts of (−1), 0 and (+1) gives a highest correlation in this correlation calculation, an interpolation calculation is executed according to the data obtained thereby (step #64) and then it is decided at step #65 whether the data obtained by the interpolation calculation at step #64 have a reasonable credibility. If they have a reasonable credibility, the objective lens is driven according to a value of the interpolated image distance XMn. Namely, a shift amount Pn of image distance is calculated based upon the interpolated image distance XMn at step #66 and, at step #13, the shift amount Pn is transformed into a defocus amount DF.

On the contrary to the above, if the decision at step #65 indicates a low contrast state, a case in which either of shift amounts of (−2) and (+2) gives a highest correlation is also involved in this case, the focus condition detection calculation similar to the first one is executed. If all of the first to third blocks I-III are decided to be in a low contrast state at step #39 a "LO-CON SCAN" is started at step #11 finally. And, at step #76, the lens drive finish flag AF is rest to zero. In this case, the focus condition detection calculation is repeated with use of all of the first to third blocks I-III and over the full shift amount range until an in-focus condition is detected.

If the one-shot AF mode is chosen, the lens drive finish flag AF is set at step #74 when an in-focus condition has been detected.

Figures 1, 10A:
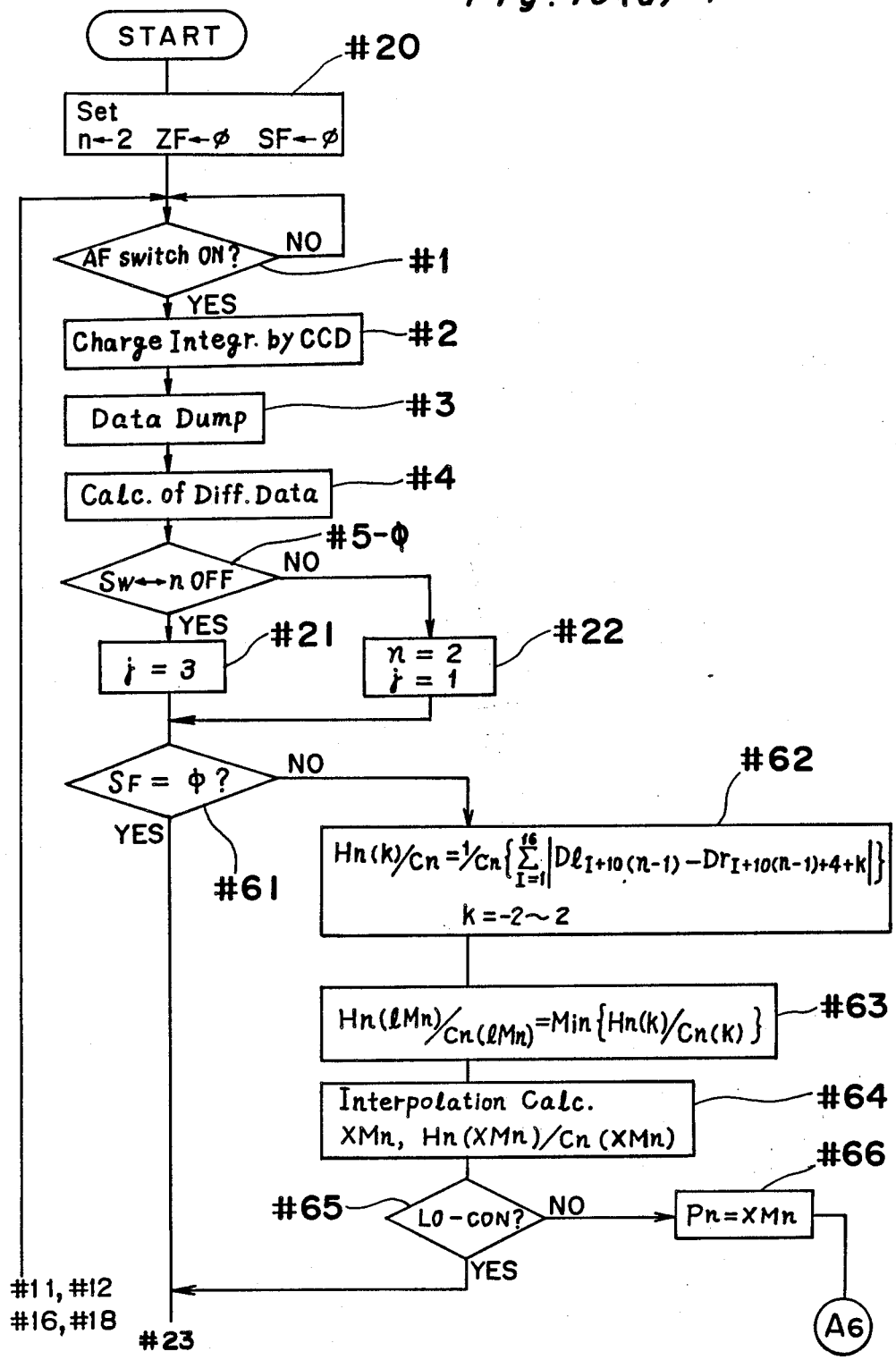
Figures 2, 10A:
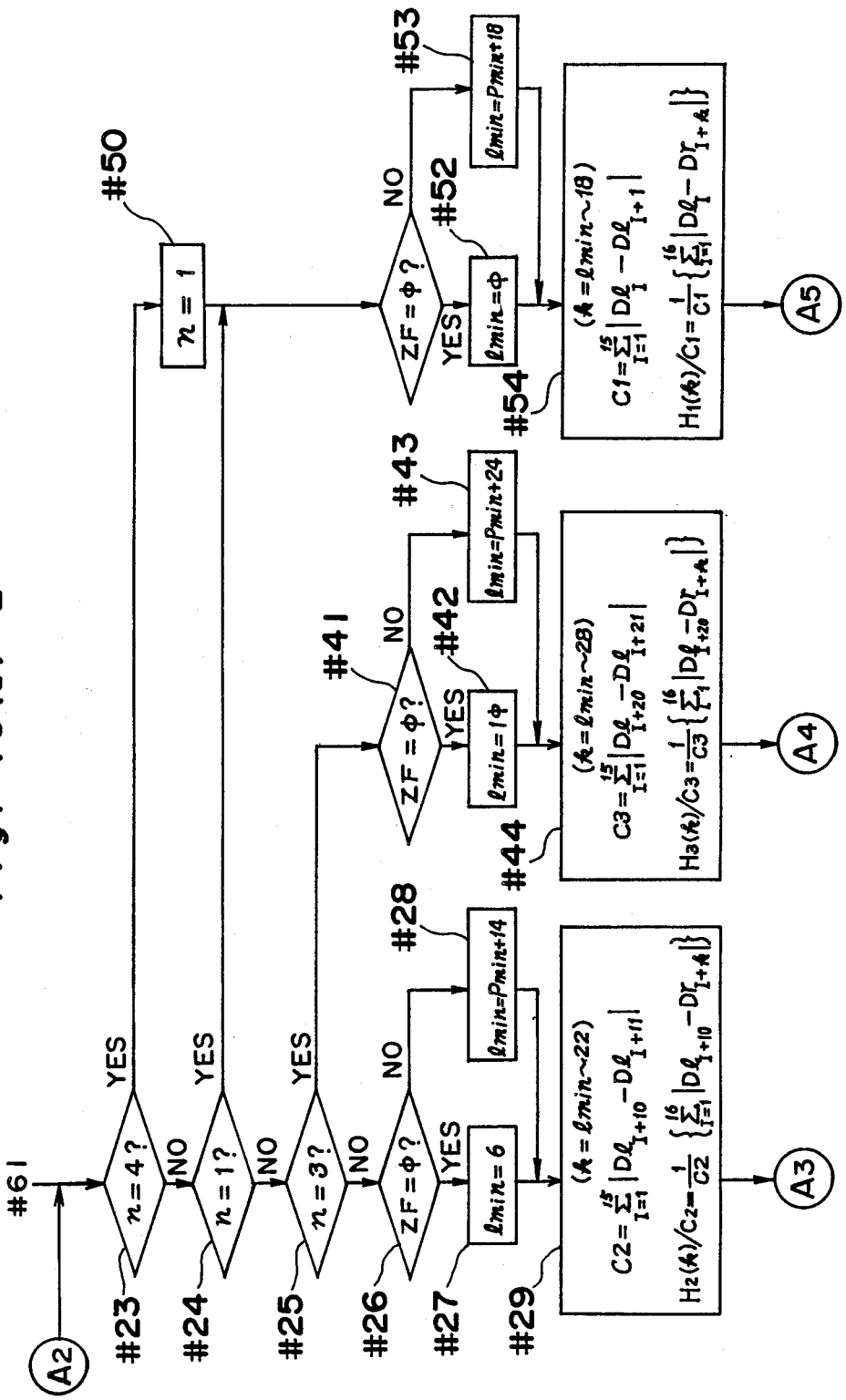
Figures 2, 10B:
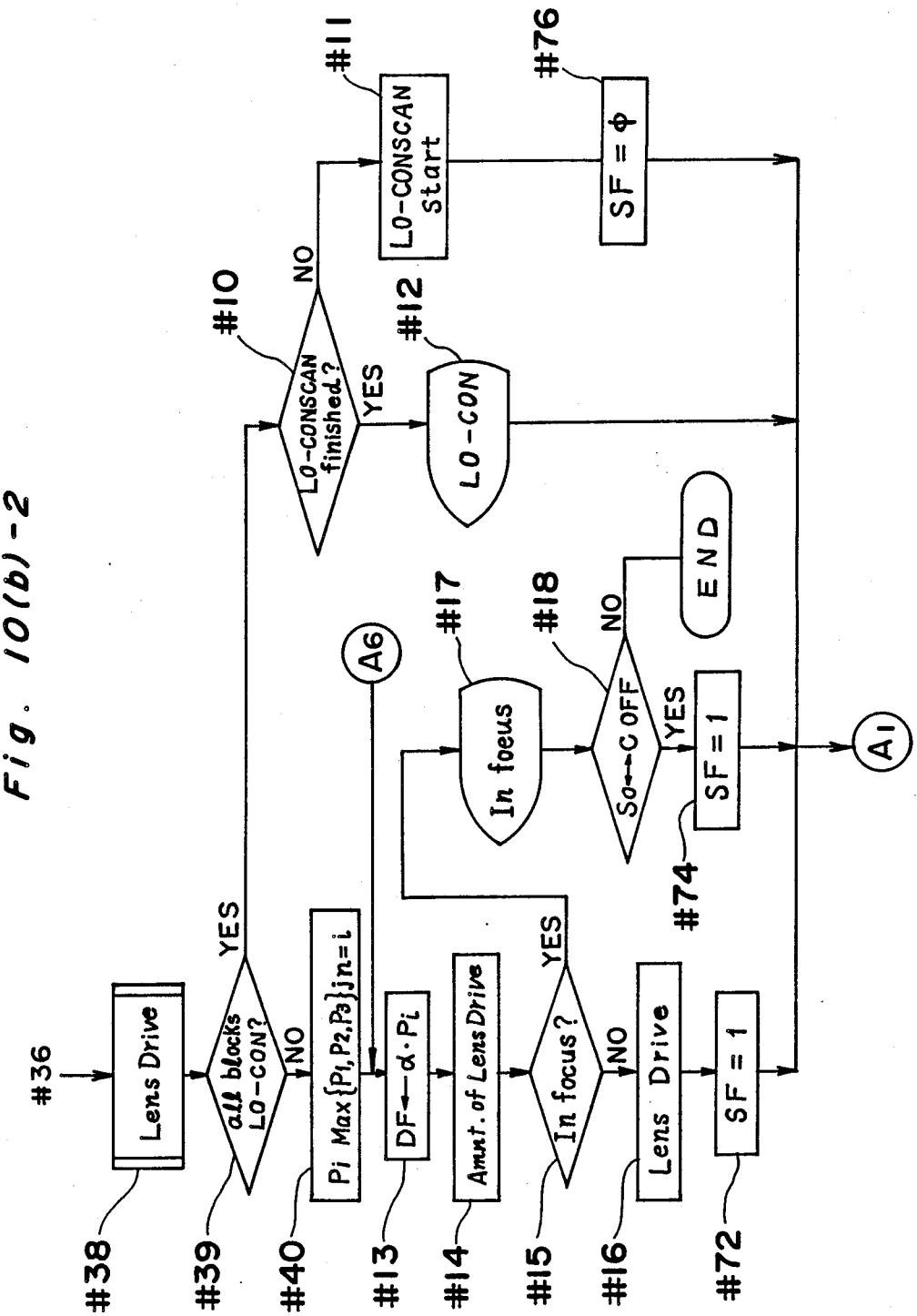

In this preferred embodiment, a focus condition detection operation is carried out after the finish of the lens driving. However, it is also possible to repeat the focus condition detection while driving the objective lens. In this case, the lens drive finish flag AF can be set only when an in-focus condition has been detected. Further, in this preferred embodiment, five shift amounts (−2, −1, 0, +1, +2) are used upon a second focus condition detection calculation. This range of the shift amount is selected depending on the accuracy of relative position adjustment between the image sensor and the refocusing lenses. If this accuracy is sufficiently high, three shift amounts of (−1, 0, +1) can be used for a second focus condition detection calculation. Further, it is possible to switch the one shot AF mode to the continuous AF mode or vice versa depending on the state of the switch Sw⟵⟶n for switching the focus detection area in the preferred embodiments of FIGS. 9 and 10 similarly to the second embodiment.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construced as being included therein.

What is claimed is:

1. An automatic focusing device, comprising:
   (a) an objective lens;
   (b) sensing means for sensing light intensity distributions within first and second areas of the field of view of said objective lens to generate first and second light intensity distribution signals, respectively, said light intensity distributions varying with the focus condition of said objective lens relative to an object;
   (c) first and second focus detection means selectively activated for detecting the focus condition of said objective lens in accordance with said first and second light intensity distribution signals, respectively;
   (d) drive means for driving said objective lens for focusing in accordance with the focus condition detected by activating one of said first and second focus detection means;
   (e) inhibiting means for inhibiting the lens drive operation of said drive means when said objective lens has been brought into an in-focus condition as a result of the lens drive operation of said drive means;
   (f) mode change-over means for changing-over the operation mode of said automatic focusing device between first and second modes wherein said first mode is a one-shot autofocus mode while said second mode is a continuous autofocus mode; and
   (g) control means for selectively activating one of said first and second focus detection means in response to the change-over of the operation mode of said automatic focusing device, so that said first focus detection means is activated in said first mode while said second focus detection means is activated in said second mode.

2. An automatic focusing device, comprising:
   (a) an objective lens;
   (b) sensing means for sensing light intensity distribution within first and second areas of the field of view of said objective lens to generate first and second light intensity distribution signals, respectively, said light intensity distributions varying with the focus condition of said objective lens relative to an object and said second area being wider than said first area;
   (c) first and second focus detection means selectively activated for detecting the focus condition of said objective lens in accordance with said first and second light intensity distribution signals, respectively;
   (d) drive means for driving said objective lens for focusing in accordance with the focus condition detected by activating one of said first and second focus detection means;
   (e) mode change-over means or changing-over the operation mode of said automatic focusing device between a one-shot autofocus mode and a continuous autofocus mode; and
   (f) control means for selectively activating one of said first and second focus detection means in response to the change-over of the operation mode of said automatic focusing device, so that said first focus detection means is activated in said one-shot autofocus mode while said second focus detection means is activated in said continuous autofocus mode.

3. A focus condition detection device, comprising:
   (a) an objective lens;
   (b) optical means for forming, from first and second light fluxes having passed through first and second areas of said objective lens, first and second images of an object such that the distance between said first and second images varies with the focus condition of said objective lens with respect to said object;
   (c) first and second sensor arrays for sensing said first and second images, respectively, each of said first and second sensor arrays having a plurality of sensing elements capable of generating an output representing the intensity of light incident thereon and forming a different portion of the corresponding image;

(d) dividing means for dividing said first sensor array into a plurality of blocks, each having a predetermined number of said sensing elements, (e) calculation means for sequentially shifting the outputs of said sensing elements of each block of said first sensor array and the outputs of said sensing elements of said second sensor array relative to one another to calculate correlation therebetween at every shift position for finding, for each block of said first sensor array, the best correlation among the calculated correlations and a best correlation shift position providing the same, and thereby for generating focus condition signals with use of the best correlation shift positions found for the respective blocks of said first sensor array;

(f) output means for selectively outputting one of said focus condition signals;

(g) storing means for storing the block of said first sensor array, for which is found said best correlation shift position used for the generation of the outputted focus condition signal by said focus condition signal generating means; and (h) control means for controlling the next time correlation calculation by said calculation means, said control means including means for causing said calculation means to calculate correlations between the outputs of said sensing element of the stored block of said first sensor array and the outputs of said sensing elements of said second sensor array preferentially.

4. A focus condition detection device as defined in claim 3, wherein said control means further includes:

means for determining reliability of the focus condition signal to be generated by said calculation means with use of the best correlation shift position found through the next time correlation calculation by said calculation means with respect to the stored block of said first sensor array; and means for causing said calculation means to calculate correlations between the outputs of said sensing elements of another one of said blocks of said first sensor array and the outputs of said sensing elements of said second sensor array when it is determined by said determining means that the reliability is relatively low while causing said calculation means to generate the focus condition signal with use of the best correlation shift position found through the next time correlation calculation by said calculation means with respect to the stored block of said first sensor array, when it is determined by said determining means that the reliability is relatively high.

5. A focus condition detection device, comprising:
(a) an objective lens;
(b) sensing means for sensing the light intensity distributions within a plurality of areas of the field of view of said objective lens to generate a plurality of light intensity distribution signals, each representing the light intensity distribution within the corresponding area;
(c) calculating means for effecting calculation of said light intensity distribution signals to generate focus condition signals, each representing the focus condition of said objective lens relative to a different portion of an object;
(d) output means for selectively outputting one of the focus condition signals generated by said calculation means;

(e) storing means for storing the area of the field of view of said objective lens corresponding to the light intensity distribution signal from which the outputted focus condition signal is generated; and (f) control means for controlling the next time calculation by said calculation means, said control means including means for causing said calculation means to preferentially effect calculation of one of said light intensity distribution signals representing the light intensity distribution within the stored area of the field of view of said objective lens.

6. A focus condition detection device as defined in claim 5, wherein said control means further includes:

means for determining reliability of the focus condition signal to be generated by said calculation means through the next time calculation of the light intensity distribution signal representing the light intensity distribution within the stored area of the field of view of said objective lens; and means for causing said calculation means to effect calculation of another one of said light intensity distribution signals when it is determined by said determining means that the reliability is relatively low while causing said calculation means to generate the focus condition signal through the next time calculation of the light intensity distribution signal representing the light intensity distribution within the stored area of the field of view of said objective lens when it is determined by said determining means that the reliability is relatively high.

7. An automatic focusing device, comprising:
(a) an objective lens;
(b) optical means for forming, from first and second light fluxes having passed through first and second areas of said objective lens, first and second images of said object such that the distance between said first and second images varies with the focus condition of said objective lens relative to an object;
(c) first and second sensing means for sensing said first and second images for generating first and second image signals representing the light intensity distributions of said first and second images, respectively;
(d) calculation means for sequentially shifting said first and second image signals relative to one another to calculate correlation therebetween at every shift position for finding the best correlation among the calculated correlations and a best correlation shift position providing the same, and thereby for generating a focus condition signal representing the amount and direction of the deviation of said objective lens from an in-focus position relative to said object;
(e) drive means for driving said objective lens for focusing in accordance with said focus condition signal;
(f) in-focus determining means for determining whether said objective lens has been driven to the in-focus position or not;
(g) storing means for storing determination by said in-focus determining means that said objective lens has been driven to the in-focus position; and
(h) shift range limiting means for limiting the range of the relative shifting of said first and second image signals upon the next time correlation calculation by said calculation means to a smaller range including an in-focus shift position which provides the best correlation among the calculated correlations when said objective lens is in-focus with respect to said object, when said determination is stored in said storing means.

8. An automatic focusing device as defined in claim 7, further comprising:
(i) reliability determining means for determining reliability of the focus condition signal to be generated by said calculation means with the range of the relative shifting of said first and second image signals changed to the smaller range; and
(j) deactivating means for deactivating said shift range changing means when it is determined by said reliability determining means that the reliability is relatively low.

9. An automatic focusing device, comprising:
(a) an objective lens;
(b) sensing means for sensing a light intensity distribution within a portion of the field of view of said objective lens to generate a light intensity distribution signal;
(c) calculation means for effecting calculation of said light intensity distribution signal to detect deviation of said objective lens from an in-focus position thereof with respect to said object and thereby to generate a focus condition signal representing the detected deviation;
(d) drive means for driving said objective lens in accordance with said focus condition signal;
(e) in-focus determining means for determining whether said objective lens has been driven to an in-focus position with respect to said portion of said object or not;
(f) storing means for storing determination by said in-focus determination means that said objective lens has been driven to the in-focus position; and
(g) calculation range limiting means for limiting the range of the deviation detection to be effected through the next time calculation by said calculation means to a smaller range including an in-focus position at which the in-focus position is detected.

10. An automatic focusing device as defined in claim 9, further comprising:
(h) reliability determining means for determining reliability of the deviation detection to be effected through the next time calculation by said calculation means with the deviation detection range limited to the smaller range; and
(i) deactivating means for deactivating said calculation range limiting means when it is determined by said reliability determining means that the reliability is relatively low.

* * * * *